United States Patent [19]
Rector

[11] Patent Number: 5,642,844
[45] Date of Patent: Jul. 1, 1997

[54] TREE STAND CARRIER FOR AN ATV

[76] Inventor: Roger Rector, P.O. Box 343, Rutherford College, N.C. 28671

[21] Appl. No.: 567,049

[22] Filed: Dec. 4, 1995

[51] Int. Cl.⁶ .................................................. B60R 7/00
[52] U.S. Cl. .................. 224/401; 224/502; 224/519; 224/520; 224/531; 224/532; 280/769
[58] Field of Search .................................. 224/401, 404, 224/405, 409, 410, 502, 505, 509, 518, 519, 520, 521, 531, 532, 453, 924, 917.5, 413; 280/760, 769

[56] References Cited

U.S. PATENT DOCUMENTS

| | | | |
|---|---|---|---|
| 2,618,509 | 11/1952 | Carlson | 224/410 |
| 2,981,554 | 4/1961 | Mulder et al. | 224/410 |
| 3,207,396 | 9/1965 | Mundell et al. | 224/502 |
| 3,776,437 | 12/1973 | Carney | 224/91.5 |
| 4,744,590 | 5/1988 | Chesney | 224/520 |
| 4,785,980 | 11/1988 | Redick | 224/917.5 |
| 5,000,363 | 3/1991 | Linquist | 224/917.5 |
| 5,222,753 | 6/1993 | Parish | 224/401 |

Primary Examiner—Henry J. Recla
Assistant Examiner—Timothy L. Maust

[57] ABSTRACT

A tree stand carrier for an ATV comprised of a U-shaped support comprised of a pair of vertical supports and a horizontal support joined at lower ends of the pair of vertical supports. Each of the pair of vertical supports has an outwardly extending edge portion thereby forming a vertical chamber. The horizontal support has an upwardly extending edge portion thereby forming a horizontal chamber. The U-shaped support is securable to an ATV for transportation of a tree stand.

4 Claims, 3 Drawing Sheets

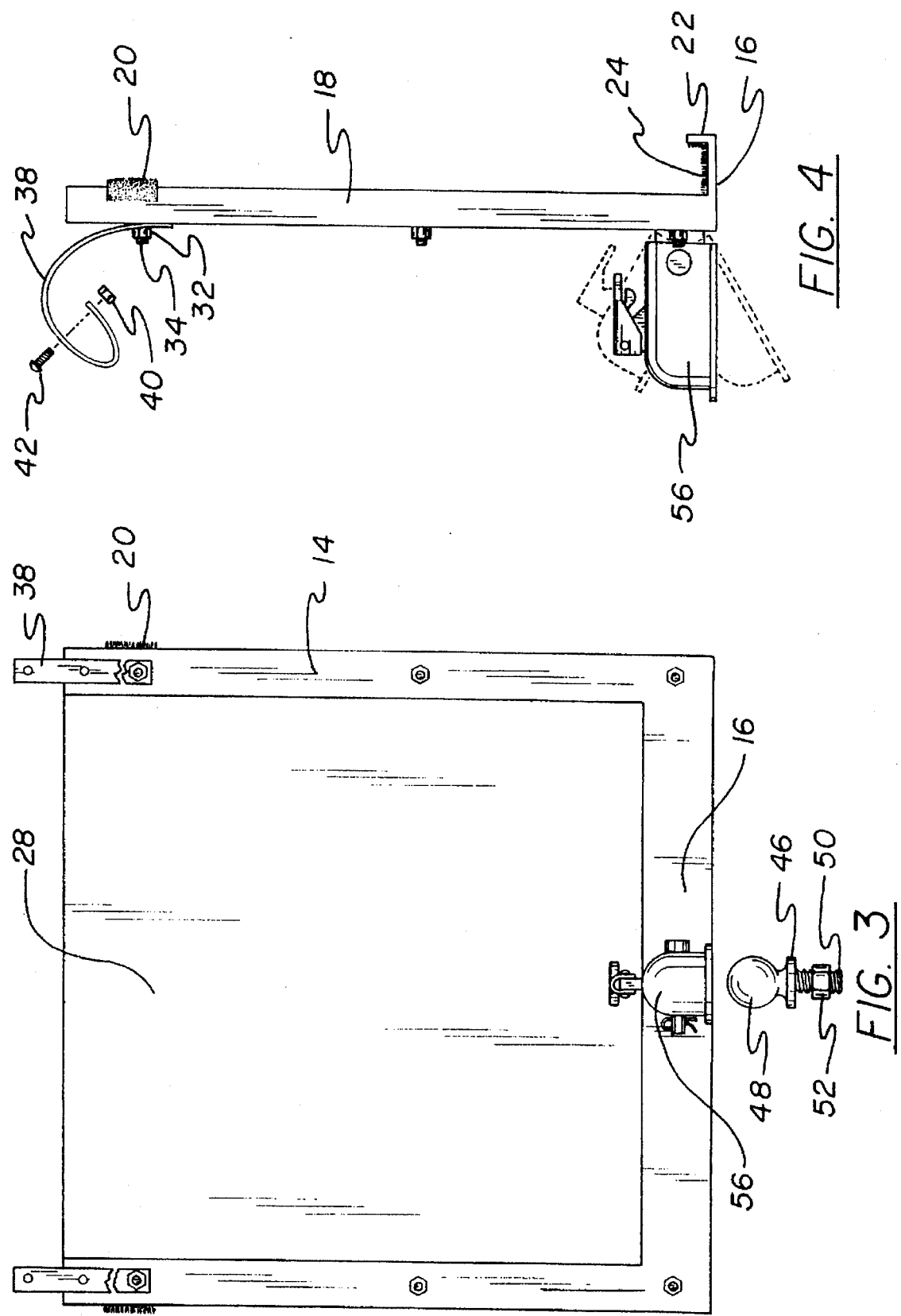

TREE STAND CARRIER FOR AN ATV

BACKGROUND OF THE INVENTION

1. Field of the Invention

The present invention relates to a tree stand carrier for an ATV and more particularly pertains to coupling to an ATV hitch for receiving a tree stand with a tree stand carrier for an ATV.

2. Description of the Prior Art

The use of ATV support racks is known in the prior art. More specifically, ATV support racks heretofore devised and utilized for the purpose of transporting various components on an ATV are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,236,062 to Laney discloses an ATV support rack apparatus.

U.S. Pat. No. 4,614,252 to Tarner discloses a portable observation structure.

U.S. Pat. No. 4,787,477 to Dolan discloses a stand for all terrain vehicle.

U.S. Pat. No. 5,105,908 to Freund discloses a ladder treestand and trailer rit.

U.S. Pat. No. 4,800,986 to Hayes, III discloses a collapsible tower for ATV's.

U.S. Pat. No. 5,282,520 to Walker discloses a portable hunting stand and game carrier.

While these devices fulfill their respective, particular objective and requirements, the aforementioned patents do not describe a tree stand carrier for an ATV for coupling to an ATV hitch for receiving a tree stand.

In this respect, the tree stand carrier for an ATV according to the present invention substantially departs from the conventional concepts and designs of the prior art, and in doing so provides an apparatus primarily developed for the purpose of coupling to an ATV hitch for receiving a tree stand.

Therefore, it can be appreciated that there exists a continuing need for new and improved tree stand carrier for an ATV which can be used for coupling to an ATV hitch for receiving a tree stand. In this regard, the present invention substantially fulfills this need.

SUMMARY OF THE INVENTION

In the view of the foregoing disadvantages inherent in the known types of ATV support racks now present in the prior art, the present invention provides an improved tree stand carrier for an ATV. As such, the general purpose of the present invention, which will be described subsequently in greater detail, is to provide a new and improved tree stand carrier for an ATV and method which has all the advantages of the prior art and none of the disadvantages.

To attain this, the present invention essentially comprises a U-shaped support comprised of a pair of vertical supports and a horizontal support joined at lower ends of the pair of vertical supports. Each of the pair of vertical supports has an outwardly extending edge portion thereby forming a vertical chamber. An upper end of each outwardly extending edge portion has a pad secured thereto. The horizontal support has an upwardly extending edge portion thereby forming a horizontal chamber. The horizontal chamber has a pad secured therein. A square portion is secured within the U-shaped support between the vertical chamber and the horizontal chamber thereof. A pair of curved metal bands are secured to a rear portion of an upper end of the pair of vertical supports for securement of the U-shaped support to an ATV rack. A ball hitch is securable to a lower portion of an ATV. A pivoting hitch is secured to a rear side of the horizontal support of the U-shaped support. The pivoting hitch is dimensioned for coupling with the ball hitch for securement of the U-shaped support to a lower portion of an ATV.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tree stand carrier for an ATV which has all the advantages of the prior art ATV support racks and none of the disadvantages.

It is another object of the present invention to provide a new and improved tree stand carrier for an ATV which may be easily and efficiently manufactured and marketed.

It is a further object of the present invention to provide a new and improved tree stand carrier for an ATV which is of durable and reliable construction.

An even further object of the present invention is to provide a new and improved tree stand carrier for an ATV which is susceptible of a low cost of manufacture with regard to both materials and labor, and which accordingly is then susceptible of low prices of sale to the consuming public, thereby making such a tree stand carrier for an ATV economically available to the buying public.

Still yet another object of the present invention is to provide a new and improved tree stand carrier for an ATV which provides in the apparatuses and methods of the prior art some of the advantages thereof, while simultaneously overcoming some of the disadvantages normally associated therewith.

Even still another object of the present invention is to provide a new and improved tree stand carrier for an ATV for coupling to an ATV hitch for receiving a tree stand.

Lastly, it is an object of the present invention to provide a new and improved tree stand carrier for an ATV comprised of a U-shaped support comprised of a pair of vertical supports and a horizontal support joined at lower ends of the pair of vertical supports. Each of the pair of vertical supports has an outwardly extending edge portion thereby forming a vertical chamber. The horizontal support has an upwardly extending edge portion thereby forming a horizontal chamber. The U-shaped support is securable to an ATV for transportation of a tree stand.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a rear elevation view of the present invention.

FIG. 4 is a side elevation view of the present invention.

The same reference numerals refer to the same parts through the various Figures.

DESCRIPTION OF THE PREFERRED EMBODIMENT

Figure 1:
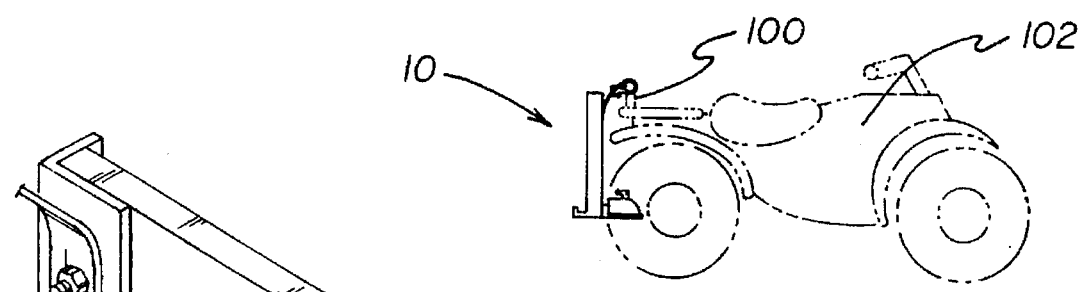
FIG. 1 is a side view of the present invention in place of an ATV.
Figure 2:
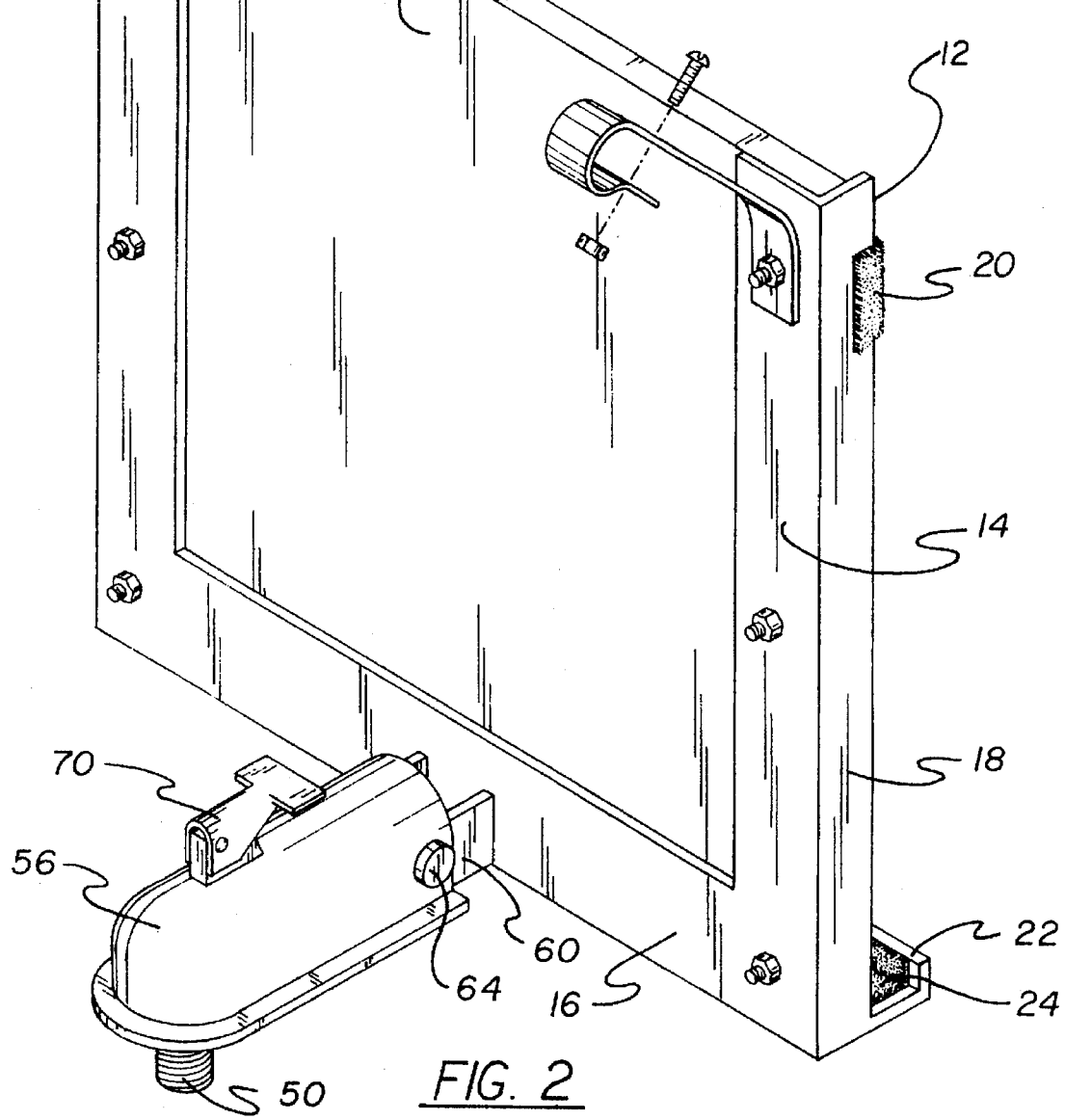
FIG. 2 is a perspective view of the preferred embodiment of the tree stand carrier for an ATV constructed in accordance with the principles of the present invention.
Figure 5:
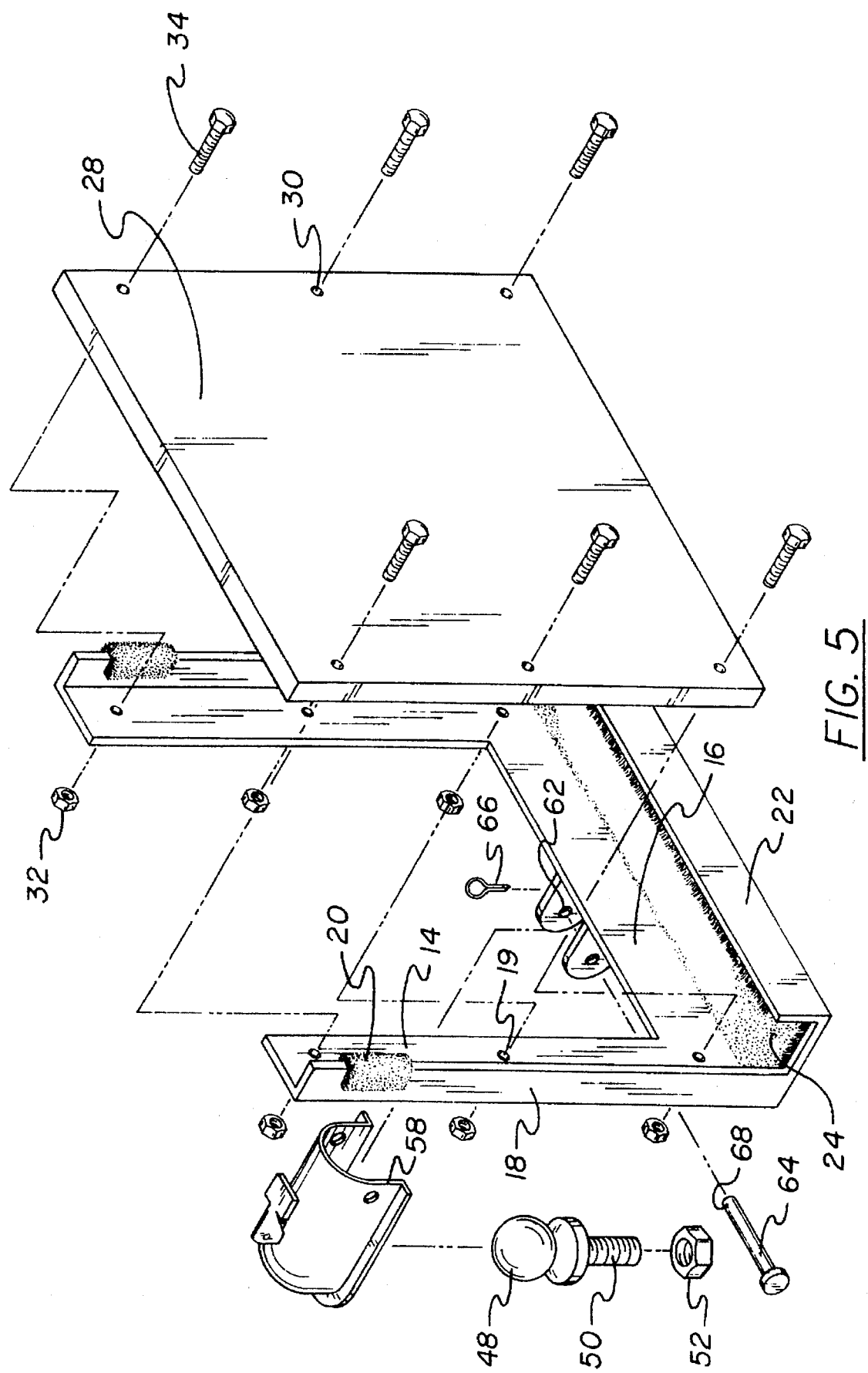
FIG. 5 is an exploded perspective view of the present invention.

With reference now to the drawings, and in particular, to FIGS. 1–5 thereof, the preferred embodiment of the new and improved tree stand carrier for an ATV embodying the principles and concepts of the present invention and generally designated by the reference number 10 will be described.

Specifically, it will be noted in the various Figures that the device relates to a new and improved tree stand carrier for an ATV for coupling to an ATV hitch for receiving a tree stand. In its broadest context, the device consists of a U-shaped support, a square portion, a pair of curved metal bands, a ball hitch, and a pivoting hitch. Such components are individually configured and correlated with respect to each other so as to attain the desired objective.

The device 10 includes a U-shaped support 12 comprised of a pair of vertical supports 14 and a horizontal support 16 joined at lower ends of the pair of vertical supports 14. Each of the pair of vertical supports 14 has an outwardly extending edge portion 18 thereby forming a vertical chamber. The vertical supports 14 each have a plurality of apertures 19 formed therethrough. An upper end of each outwardly extending edge portion 18 has a pad 20 secured thereto. The horizontal support 16 has an upwardly extending edge portion 22 thereby forming a horizontal chamber. The horizontal chamber has a pad 24 secured therein.

A square portion 28 is secured within the U-shaped support 12 between the vertical chamber and the horizontal chamber thereof. The square portion 28 has a plurality of apertures 30 formed therethrough adjacent side edges thereof. The plurality of apertures 30 are aligned with the plurality of apertures 19 formed through the vertical supports 14 for securement thereto by a plurality of nuts 32 and bolts 34.

A pair of curved metal bands 38 are secured to a rear portion of an upper end of the pair of vertical supports 14 for securement of the U-shaped support 12 to an ATV rack 100. The curved metal bands 38 are secured by two of the nuts 32 and bolts 34 securing the square portion 28 to the U-shaped support 12. Each of the curved metal bands has a nut 40 and bolt 42 for securement to the ATV rack 100.

A ball hitch 46 is securable to a lower portion of an ATV 102. The ball hitch 46 has a rounded upper portion 48 and a threaded lower portion 50. The threaded lower portion 50 is used to extend through an existing bracket on the lower portion of the ATV. A nut 52 is used to secure the ball hitch 46 to the bracket on the lower portion of the ATV 102.

A pivoting hitch 56 is secured to a rear side of the horizontal support 16 of the U-shaped support 12. The pivoting hitch 56 is dimensioned for coupling with the ball hitch 46 for securement of the U-shaped support 12 to a lower portion of an ATV 102. The pivoting hitch 56 has a proximal end 58 that is pivotally coupled to a securement bracket 60 on the U-shaped support 12. The support bracket 60 has a pair of apertures 62 formed therethrough for receipt of a pivot pin 64 therethrough. The pivot pin 64 is pivotally coupled with the proximal end 58 of the hitch 56. The pivot pin 64 is held in place through the pair of apertures 62 by a clip 66 extending through an aperture 68 in an end of the pivot pin 64. The pivoting hitch 56 has a locking mechanism 70 therein to facilitate the locking of the pivoting hitch 56 on the rounded portion 48 of the ball hitch 46.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A tree stand carrier for an ATV for coupling to an ATV hitch for receiving a tree stand comprising, in combination:

a U-shaped support comprised of a pair of vertical supports and a horizontal support joined at lower ends of the pair of vertical supports, each of the pair of vertical supports having an outwardly extending edge portion thereby forming a vertical chamber, an upper end of each outwardly extending edge portion having a pad secured thereto, the horizontal support having an upwardly extending edge portion thereby forming a horizontal chamber, the horizontal chamber having a pad secured therein;

a square portion secured within the U-shaped support between the vertical chamber and the horizontal chamber thereof;

a pair of curved metal bands secured to a rear portion of an upper end of the pair of vertical supports for securement of the U-shaped support to an ATV rack;

a ball hitch securable to a lower portion of an ATV;

a pivoting hitch secured to a rear side of the horizontal support of the U-shaped support, the pivoting hitch being dimensioned for coupling with the ball hitch for securement of the U-shaped support to a lower portion of an ATV.

2. A tree stand carrier for an ATV comprising:

a U-shaped support comprised of a pair of vertical supports and a horizontal support joined at lower ends of the pair of vertical supports, each of the pair of vertical supports having an outwardly extending edge portion thereby forming a vertical chamber, the horizontal support having an upwardly extending edge portion thereby forming a horizontal chamber, the vertical chamber and the horizontal chamber each having at least one pad disposed therein, the U-shaped support having means for securement to an ATV, the means for securement to an ATV comprising a pair of curved metal bands secured to a rear portion of an upper end of the pair of vertical supports for securement of the U-shaped support to an ATV rack.

3. The tree stand carrier as set forth in claim 2 and further including a square portion secured within the U-shaped support between the vertical chamber and the horizontal chamber thereof.

4. The tree stand carrier as set forth in claim 2 wherein the means for securement to an ATV comprising a pivoting hitch secured to a rear side of the horizontal support of the U-shaped support, the pivoting hitch being dimensioned for coupling with a ball hitch on a rear of the ATV for securement of the U-shaped support to a lower portion of an ATV.

\* \* \* \* \*